(12) United States Patent
Oh et al.

(10) Patent No.: US 6,187,475 B1
(45) Date of Patent: Feb. 13, 2001

(54) AQUEOUS ZINC SULFATE (II) RECHARGEABLE CELL CONTAINING MANGANESE (II) SALT AND CARBON POWDER

(75) Inventors: Seung-Mo Oh, Ahanyang; Sa-Heum Kim, Kunpo, both of (KR)

(73) Assignee: Finecell Co., Ltd. (KR)

( * ) Notice: Under 35 U.S.C. 154(b), the term of this patent shall be extended for 0 days.

(21) Appl. No.: 09/203,092

(22) Filed: Dec. 1, 1998

(30) Foreign Application Priority Data

Aug. 31, 1998 (KR) .................................................. 98-35464
Sep. 16, 1998 (KR) .................................................. 98-38912

(51) Int. Cl.$^7$ ...................................................... H01M 6/04
(52) U.S. Cl. ......................... 429/205; 429/224; 429/229; 429/232
(58) Field of Search .................................. 429/224, 229, 429/232, 188, 206, 207, 205; 252/62.2

(56) References Cited

U.S. PATENT DOCUMENTS 4,207,391 * 6/1980 Church et al. .
5,516,604 * 5/1996 Mieczkowska et al. .

FOREIGN PATENT DOCUMENTS 05166540   2/1993   (JP) .
06044975   2/1994   (JP) .

OTHER PUBLICATIONS

McLarnon, F., et al., "The Secondary Alkaline Zinc Electrode" *Journal of Electrochemical Society*, vol. 138, No. 2, Feb. 1991, pp. 645–664.

Ghosh, S., et al., "Study of the Mechanism of Cathodic Reduction of Gamma Manganese Dioxide in Leclanche Cell System", *Electrochimica Acta*, vol. 7, pp. 449–455 (1962) No Month.

Bear, I.J., et al., "The $ZnSO_4 \cdot 3Zn(OH)_2$–$H_2O$ System. I Phase Formation", *Austrailian Journal of Chemistry*, vol. 40, 1987, pp. 539–556.

Shoji, T. et al., "Zinc–manganese dioxide galvanic cell using zinc sulphate as electrolyte. Rechargeability of the cell", *Journal of Applied Electrochemistry*, vol. 18, pp. 521–526 (1988) No Month.

Shoji, T. et al., "Charging and discharging behavior of zinc–manganese dioxide galvanic cells using zinc sulfate as electrolyte", *Journal of Electroanalytical Chemistry*, vol. 362, pp. 153–157 (1993) No Month.

Askar, M.H., et al., "Rechargeability of manganese dioxide/zinc cell using zinc sulfate electrolyte", *Journal of Power Sources*, vol. 48, pp. 303–309,(1994) No Month.

Gummow, R.J., et al., "Improved capacity retention in rechargeable 4 V lithium/lithium–manganese oxide (spinel) cells", *Solid State Ionics*, vol. 69, pp. 59–67, (1994) No Month.

Jang, D.H., et al., "Dissolution of Spinel Oxides and Capacity Losses in 4 V $Li/Li_xMn_2O_4$ Cells", *Journal of Electrochemical Society*, vol. 143, No. 7, Jul. 1996, pp. 2204–2211.

Yamamoto, T. et al., "Rechargeable $Zn/ZnSo_4/MnO_2$–type Cells", *Inorganica Chimica Acta*, vol. 117, pp. L27–L28 (1986) No Month.

* cited by examiner

*Primary Examiner*—Maria Nuzzolillo
*Assistant Examiner*—Susy Tsang
(74) *Attorney, Agent, or Firm*—Ladas & Parry

(57) ABSTRACT

A rechargeable cell which is comprised of a cathode material, an anode material and an electrolyte, wherein said cathode material is a mixture of manganese dioxide and electrically conducting material, with said anode material being zinc or a zinc alloy, said electrolyte is 0.5M to 3M aqueous zinc sulfate solution, and manganese (II) salt is added to at least one of the said cathode material, anode material or electrolyte, in total, has an excellent capacity and reversibility.

11 Claims, 9 Drawing Sheets

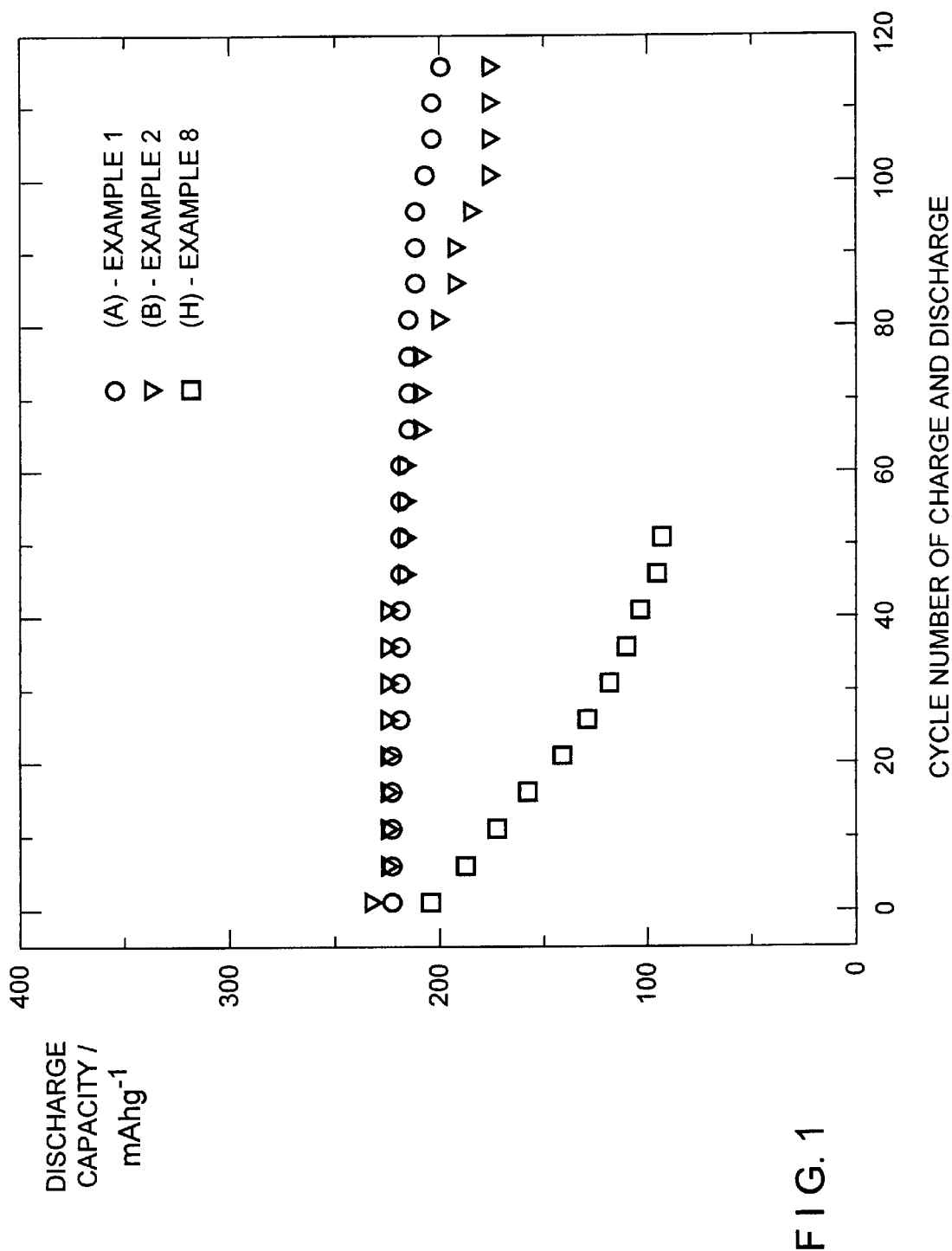
F I G. 1

AQUEOUS ZINC SULFATE (II) RECHARGEABLE CELL CONTAINING MANGANESE (II) SALT AND CARBON POWDER

BACKGROUND OF THE INVENTION

1. Field of the Invention

The present invention relates to a rechargeable cell that employs manganese dioxide as a cathode material, zinc as an anode material and aqueous zinc sulfate solution as an electrolyte. More specifically, it relates to a rechargeable cell, characterized in that an appropriate amount of manganese (II) salt and carbon powder are added in order to inhibit the decrease in cell capacity resulting from repeated charge/discharge cycling.

2. Description of the Prior Art

Cells are widely used as a power source for electronic and electric apparatuses. The recent trends towards miniaturization, lightweight, higher performance, portability, and personal use of electronic and electric apparatuses have brought about increased demand for rechargeable cells that are economical and suitable for long term use. The necessity of the development and production of rechargeable cells stems from the need to replace the demand for primary cells, which are once discharged and discarded, and to cut down serious energy loss and environmental problems. In view of the fact that the energy needed for the production of primary cells is more than ten times larger than the energy obtainable from those produced, the use of rechargeable cells reduces energy waste. In addition, the development of rechargeable cells can bring various kinds of advantages since primary cells are wasteful, and there are environmental problems associated with their use. To achieve these advantages, research and development of rechargeable cells have been conducted primarily on nickel-cadmium cells, nickel-hydrogen cells and alkaline manganese dioxide-zinc cells. In particular, it is estimated that alkaline rechargeable cells that employ zinc as an anode material have the advantages of high energy density and economically low cost. Furthermore, it is expected that the demand for the alkaline rechargeable cells will increase as the use of toxic lead-acid and nickel-cadmium cells becomes restricted.

However, rechargeable cells employing zinc as an anode material have disadvantages including: instability of the zinc anode material and short cycle life. The main reasons for deteriorating performances of the zinc electrode are uneven dissolution during the discharging period and the Zn deposition during the charging period during repeated charge/discharge cycling. In other words, zinc is dissolved unevenly and irregularly during the discharging period because of minute differences in the surfaces of zinc electrodes. As a result, the zinc electrode surface will become rougher with the progress of the discharge, and the zinc electrode will come to be deformed. On the contrary, during the charging period, zinc deposits in a tree-branch form (which is called a dendrite). The dendrite will grow toward the cathode wit repeated charge/discharge cycling. The deposited zinc will ultimately penetrate the separator to cause an internal short-circuit. Furthermore, with repeated charge and discharge cycling, polarization from equilibrium potential of zinc/zinc ion (II) becomes more severe (increase of overpotential), causing the decomposition of electrolyte, which in turn causes a gas evolution and electrolyte exhaustion. The phenomena such as deformation of zinc anode, dendritic growth, gas evolution and electrolyte exhaustion should be prohibited, because they may extremely threaten the reversibility and stability of not only the zinc anode but also the cell itself.

The effects demanded of the zinc anode additives can be summarized as follows:

i) the prohibition of hydrogen evolution, ii) the prohibition of the zinc compound's dissolution, iii) the formation of a rigid zinc electrode surface via electrodeposition together with zinc (the prohibition of dendritic growth), iv) the formation of a metal surface having good electrical conductivity for the rigid electrodeposition of zinc, v) the guiding out uniform current distribution, vi) the improvement of wettability of the zinc electrode, vii) the improvement of electronic conductivity of the zinc electrode, viii) the decrease in mass transfer resulting from the formation of a complex with a water soluble zinc compound, ix) the improvement of availability of the zinc electrode, x) the maintenance of a porous structure for the zinc electrode.

Taking into account those requirements, methods of using alloys between various kinds of metals and zinc or adding metal oxide have been employed hitherto. In addition, the methods of adding many additives to electrolytes have also been developed (*J. Electrochem. Soc.*, 138, 645 (1991)).

In addition to the above-mentioned problems relating to zinc electrodes, there is a restriction relating to manganese dioxide cathodes caused by the irreversibility of cathodes. For example, in order to obtain 100 or more cycles of charge/discharge performance, the discharge capacity should be restricted not to exceed 25% of one-electron theoretical capacity. This is because the product of one-electron discharge, MnOOH loses its electrochemical activity. The possibility of recharging (oxidizing) manganese dioxide of which discharge capacity is almost utilized (deeply discharged) is limited to the initial few cycles along with a drastic capacity loss. The causes of this irreversibility can be explained in many ways, including the loss of surface conductivity, the increase of internal resistance of the reaction intermediate or product, and the production of $Mn_2O_3$, $Mn_3O_4$ or $ZnO.Mn_2O_3$. According to the McBreen's explanation (*Electrochim. Acta*, 7, 449 (1962)), the initial crystal lattice is broken down during the first-electron discharging period to produce amorphous MnOOH, which is then reduced to $Mn(OH)_2$ during the second-electron discharging period. This is accumulated in the form of irreversible $Mn_3O_4$ or $ZnO.Mn_2O_3$ during the charging period to cause the deterioration of the cell performance, which makes charging reaction impossible.

The alkaline manganese dioxide-zinc cells are the most widely used systems in the primary cell market. It is expected that their usage will increase since they not only have reliability but also cause fewer environmental problems, utilize comparatively inexpensive and abundant materials, can easily be discharged at a high rate and show stable discharging performances. They have been found to have, however, critical disadvantages. The charging performance of the alkaline manganese dioxide-zinc cells are not good except in cases that manganese dioxide and electrolyte systems are in a new form, and zinc is not in high purity. In this context, a more detailed description regarding a conventional manganese dioxide-aqueous zinc solution cell system follows.

Convention Aqueous Manganese Dioxide-Zinc Cell System

The aqueous solution manganese dioxide-zinc cell system has been one of the most widely used primary cell systems up to now. It has been provided in the form of Le Clanche cell, zinc chloride (heavy-duty) cell and alkaline cell. These cells utilize almost the same electrochemical reactions; however there are several differences in the method for producing manganese dioxide and zinc, purity, additives and the composition of each electrolyte.

Manganese dioxide has advantages in that it is inexpensive and does not cause severe environmental problems. Zinc also has advantages in that it is inexpensive and has great energy density in aqueous solution. Therefore, the study and commercialization of manganese dioxide-zinc primary cells with such advantages have become the objects of concern for a long time. Accordingly, many attempts to develop rechargeable cells with sufficient reversibility and high energy density from such cell systems have been conducted. However, no dramatic results have been accomplished yet. This is because there are critical problems which are the decline of reversibility of manganese dioxide, the corrosion and the dendritic growth of zinc.

The studies to develop rechargeable counterparts by improving such cells as Le Clanche or zinc chloride cells using strong acidic electrolyte have not produced remarkable results up to now, nor have alkaline rechargeable cells. In particular, there still exist problems to be considered such as corrosion, non-uniform dissolution and electrodeposition of zinc in the alkaline electrolyte, and internal short circuiting due to dendritic growth. In addition, there is a problem regarding the loss of reversibility in manganese dioxide, since the corrosion product of zinc reacts with manganese dioxide to form irreversible hetaerolite ($ZnO.Mn_2O_3$).

For these reasons, zinc sulfate is considered as a promising electrolyte because it can work as a good reversible electrolyte for a manganese dioxide and zinc battery system, although it has not been greatly noted. Although this electrolyte has electrical conductivity around 50 mS/cm at room temperature, which is rather smaller than that of alkaline electrolyte (>400 mS/cm), and although it has also a problem with zinc corrosion, it has been developed as new electrolyte. This is because it has high reversibility of electrochemical oxidation/reduction for manganese dioxide/manganese ion (II) and zinc/zinc ion (II).

As an electrolyte, zinc salts have been used. Examples of zinc salts include $ZnCl_2$, $ZnBr_2$, $Zn(O_2CCH_3)_2$, $Zn(NO_3)_2$ and $Zn(ClO_4)_2$ in addition to zinc sulfate. Among them, zinc sulfate is most preferred, because it comprises the sulfate anion that is preferred in the procedure of electrodeposition of zinc, and is also employed in the process for producing electrolytic manganese dioxide.

Shoji et al., reported test results for new systems employing various kinds of manganese dioxide as cathode materials and 2M aqueous zinc sulfate solution as an electrolyte (*Inorg. Chim. Acta,* 117, L27 (1986), *J. Appl. Electrochem.,* 18, 521 (1988), *J. Electroanal. Chem.,* 362, 153 (1993), *Japan Patent Publication* 05166540 (1993)), which showed there was still a margin to develop cells with improved reversibility and excellent capacity.

Yamamoto also reported similar results as Shoji et al. (Japan Patent Publication 06044975 (1994)). Likewise, Askar et al. disclosed experimental results concerning a cell employing 1 M aqueous zinc sulfate solution as an electrolyte (*J. Power Sources,* 48, 303 (1994)). The results showed that the cell has a good initial capacity, however, the cell had disadvantages in that the capacity was not regenerated and restored to the initial state due to incomplete charging. In addition, no definite mention was made regarding its reversibility.

It is well known that sulfate ion ($SO_4^{2-}$) shows considerable effect on the reversibility of the reaction between manganese dioxide/manganese ion (II) as well as the reaction between zinc/zinc ion (II). Therefore, it can be determined that the zinc sulfate electrolyte system will give a positive effect on developing rechargeable cells by improving manganese dioxide-zinc cell systems.

However, the use of zinc sulfate electrolyte does not fully guarantee the improvement of reversibility in a manganese dioxide-zinc cell system. Chiba et al. explained that the irreversibility encountered in manganese dioxide/aqueous zinc sulfate solution/zinc cells is caused by an internal short circuit resulting from a dendritic growth of zinc. They suggested replacing the substrate of zinc anode or the surface of the substrate with lead (Pb) or a lead alloy to solve the internal short circuit, and reported the experimental results (U.S. Pat. No. 4,968,569 (1990)). However, it is believed that such attempts to solve the above-mentioned problems by improving the zinc electrode did not show good results. This was because even the use of an improved zinc anode showed the capacity diminished of about 18% to 39% after 50 cycles of charging and discharging.

Likewise, when an electrolyte consisting of only zinc sulfate was used, the capacity decrease persisted in spite of good initial capacity, as seen from the Shoji et al.'s result. Askar et al. also pointed out that such electrolyte does not have good reversibility.

As can be understood from extensive study results that the main reason for irreversibility occurring in the manganese dioxide/aqueous zinc sulfate solution/zinc rechargeable cell was directly related to the problems of manganese dioxide cathode, particularly, to the incomplete charging problem. The main causes of capacity decrease or incomplete charging are primarily the dissolution of manganese, which proceeds in a side reaction with repeated charge and discharge cycling, and material loss thereby. In addition, the production of basic zinc sulfate hydrate, $ZnSO_4.3Zn(OH)_2.nH_2O$, on the surface of the manganese dioxide cathode can be considered another possible reason.

The decrease in cell capacity due to the dissolution of manganese from the manganese oxide cathode material of the cell has been already reported by many researchers and its reaction mechanism has been explained in many ways. Thackeray et al. reported that manganese is dissolved via disproportionation in manganese (III) state (*Solid State Ionics,* 69, 59 (1994)). Jang et al. reported that the dissolution of manganese was carried out by side reactions of an electrolyte or a conducting material at high oxidation potential (*J. Electrochem. Soc.,* 143, 2204 (1996)).

The zinc sulfate electrolyte used in the present invention is capable of conducting a two-electron reaction between manganese dioxide (IV) and manganese ion (II). During the discharging period, manganese dioxide in a solid state is reduced to manganese ion (II) in an aqueous solution state (reaction in which two electrons are involved with regard to one manganese atom). During the charging period, the reverse reaction proceeds. Moreover, the electrolyte has very high solubility for manganese ion (II) (>>2M). Additionally, if manganese ion (II) dissolved into the electrolyte during the discharging period is not completely restored to manganese dioxide during the charging period, the loss of cathode material (the decrease of total amount of manganese sued as a cathode material) and incomplete charging phenomenon occur, which keep diminishing the capacity for a longer term.

Furthermore, since the discharging reaction consumes a hydrogen ion of the electrolyte, pH increases locally around the surface of manganese dioxide cathode, which may cause the formation of basic zinc sulfate hydrates, $ZnSO_4 \cdot 3Zn(OH)_2 \cdot nH_2O$. Thus produced basic zinc sulfate hydrates are accumulated around the electrode surface (interface between the electrolyte and electrode), inhibiting charge and mass transfer, which causes incomplete charging and capacity decline. The above-mentioned basic zinc sulfate hydrates are stable in the particular pH range (pH >2.8). Therefore, as pH of the aqueous solution decreases, the basic zinc sulfate hydrates become unstable, which causes the dissolution of the basic zinc sulfate hydrates or inhibits the production of the basic zinc sulfate hydrates. In order to determine whether or not the basic zinc sulfate hydrates are produced, the basic zinc sulfate hydrates (trihydrate, tetrahydrate, pentahydrate) were synthesized in accordance with Bear's method (*Aust. J. Chem.*, 40, 539 (1987)) and were compared.

As seen from the foregoing, it was found that the deterioration of cell performance is involved with not only the problems relating to manganese dioxide cathode but also the deformation and a dendritic growth of zinc anode and overpotential increase and the related gas evolution problems therefrom. As is pointed out by Chiba et al., the fact that the capacity decline could be more or less prohibited by replacing the substrate zinc anode or substrate surface with lead or a lead alloy confirms the presence of a problem resulted from the dendritic growth of zinc anode. However, the addition of lead as an additive to zinc in order to decrease the overpotential of zinc electrode and inhibit gas evolution is widely known. Therefore, the results of Chiba et al. may not be simply due to the inhibition of the dendritic growth of zinc. Summing up the result of Chiba et al., it was clearly understood that the addition of lead as an additive for zinc electrode of the zinc sulfate electrolyte system did not bring enormous effects.

In sum, when aqueous zinc sulfate solution is used as an electrolyte for a manganese dioxide-zinc rechargeable cell, the decrease in cell capacity is caused with repeated charge/discharge cycling due to the following four reasons. First, the manganese content in the manganese dioxide cathode decreases because of the incomplete charging or other side reactions. Second, due to the formation of basic zinc sulfate hydrate, the structure of the electrode surface is deteriorated to inhibit the free transfer of charge and mass, which render electrode reaction difficult to proceed. Third, the internal short circuit occurs due to the dendritic growth or irregular electrodeposition of the zinc anode, and thus the reversibility decreases for a long term. Fourth, decomposition of electrolyte and gas evolution are accelerated with the increase of overpotential of the zinc anode.

SUMMARY OF THE INVENTION

Accordingly, it is an object of the present invention to develop electrodes and an electrolyte system that can solve the problems encountered in zinc and manganese dioxide electrodes. Ultimately, it will provide long term charge/discharge cycling stability and reversibility in the construction of aqueous solution rechargeable cells employing common and commercial manganese dioxide as a cathode material and Zn as an anode material. Specifically the purpose of the present invention resides in establishing a rechargeable cell comprising a cathode made of a mixture of manganese dioxide, a conducting material and a binder, an anode made of zinc metal or a mixture of zinc metal powder, an additive and a binder, and aqueous $ZnSO_4$ solution used as the electrolyte, wherein an appropriate amount of manganese (II) salt is added to the electrolyte and/or electrode, and carbon powder is added to the zinc anode in order to inhibit the decrease in cell capacity with repeated charge/discharge cycling.

The above and other objects and features of the present invention will become apparent to those skilled in the art from the following detailed description. It should be understood, however, that the detailed description and specific examples, while indicating preferred embodiments of the present invention are given by way of illustration and not limitation. Many changes and modifications within the scope of the present invention may be made without departing from the spirit thereof, and the invention includes all such modifications.

BRIEF DESCRIPTION OF THE DRAWINGS

FIG. 1 shows a comparison of the variation of discharge capacities of manganese dioxide-zinc rechargeable cell produced in accordance with Examples 1 and 2 of the present invention and Comparative Example (Example 8) according to the cycle number of charge and discharge at a constant current;

DETAILED DESCRIPTION OF THE PREFERRED EMBODIMENTS

Figure 2:
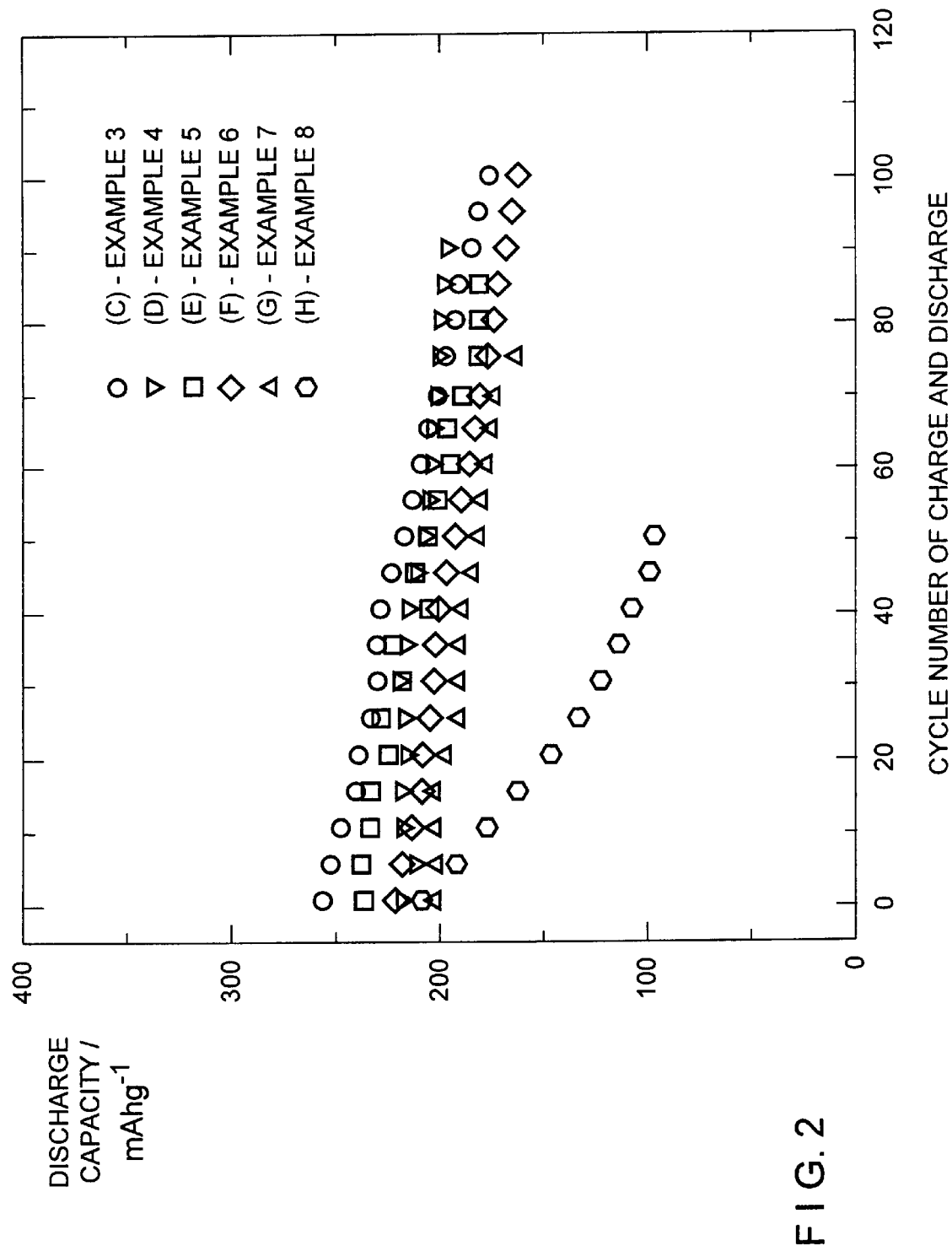
FIG. 2 shows a composition of the variation of discharge capacities of manganese dioxide-zinc rechargeable cell produced in accordance with Examples 3, 4, 5, 6 an 7 of the present invention and Comparative Example (Example 8) according to the cycle number of charge and discharge at a constant current.

The present invention provides a rechargeable cell consisting of a cathode, an anode and an electrolyte. The cathode, anode and electrolyte are the primary constitution elements of the rechargeable cell, and additional constitution elements such as a separator can be included.

As a manganese dioxide used as a cathode material, there can be mentioned, for example, natural manganese dioxide, chemical manganese dioxide, electrolytic manganese dioxide or all stoichiometric or nonstoichiometric manganese dioxides which can be obtained. In other words, all the manganese dioxides, which are used or known as a cathode of a cell, may be employed. It is preferred that the cathode material is a mixture of manganese dioxide together with a conducting material having an electronical conductivity and a binder. The conducting material is added in an amount of from about 3% by weight to about 15% by weight, based on the total weight of the cathode material. The conducting materials are carbon powder selected from the group consisting of acetylene black, thermal black, furnace black, channel black, graphite and activated carbon. These conducting materials may be used singly or as a mixture of two or more of them. Among them, acetylene black or furnace black is particularly preferred. If the amount of the conducting material added is not more than about 3% by weight, the electronical conductivity decreases, resulting in overpotential. If it is more than about 15% by weight, there are problems in that the energy density decreases and the side reactions due to the conducting material become severe. If desired, a binder may be added in an amount of not more than about 15% by weight, based on the total weight of the cathode material. As binders, there can be used polymer materials that can maintain or improve the binding force among manganese dioxide, conducting material and current collector; for example, at least one polymer or a blend/copolymer of more than two selected from the group consisting of polyvinyl alcohol (PVA), polyvinyl chloride (PVC), polyacrylonitrile (PAN), polyethylene oxide (PEO), polytetrafluoroethylene (PTFE), polyvinylidene difluoride (PVdF) and polymethyl methacrylate (PMMA). When the a small amount of binder is added, there are problems in that the binding force of the electrode decrease. When the amount of binder added is more than about 15% by weight, there are problems in that the processability and porosity of the electrode decrease.

The zinc employed as an anode material can be used in the form of a foil (sheet), or in a mixture of metal powder with an additive and a binder in a similar fashion to the manganese dioxide cathode. In order to provide a zinc anode having wide surface area, the powder form is preferable to foil form. It is preferred that the purity of zinc metal is high. It is also possible to use an alloy of zinc with metal selected for special purpose. Salts such as zinc sulfate and manganese sulfate and/or carbon powder may be added to a zinc anode. The salts such as zinc sulfate and manganese sulfate may be used as pore former, and lead the dissolution and electrodeposition of zinc in several places on the surface and inner side of the zinc anode. The carbon powder makes a conducting path among zinc powder to increase electronic conductivity, and exerts action as a seed in the course of dissolution and electrodeposition, maintaining the shape of the zinc anode evenly. Therefore, it is important that the carbon powder is mixed with zinc powder and a binder to be dispersed evenly throughout the electrode. The amount and kinds of binder added to the anode material are generally similar to those of binders added to the cathode material, but the binder may be deleted or replaced with other materials such as cellulose and a starch depending on the kinds of cell or electrode.

Thus obtained each cathode material and anode material in the mixture form may be pressed to form pellets or subjected to screen printing to form thin films, which are then combined with a current collector to be used. In addition, they may be used as a gel by mixing them with an electrolyte and a gelling agent. The production method, constituent and composition of such electrode material mixtures and fabricating process may be chosen in view of the shape and characteristics of the cell. The present invention does not compare the advantages and disadvantages of each method and these selective matters do not restrict the intent and scope of the present invention.

As an electrolyte, aqueous zinc sulfate solution in mainly used, although the electrolyte is not limited to it. The water used as the solvent is preferably deionized water. It is preferred that zinc sulfate has high purity. Generally, zinc sulfate preferably has a purity of 99% or more. It is preferred that the concentration of zinc sulfate is in the range of about 0.5M to about 3M. It is more preferred that the concentration of zinc sulfate is in the range of about 1M to about 2.5M. The zinc sulfate electrolyte has advantages in that it can easily be produced and handled, and it is considerably stable with the use of water as the solvent. Moreover, it has excellent conductivity, which in turn improves the charge/discharge cycling characteristics of the cell.

However, when aqueous zinc sulfate solution is used as an electrolyte of the manganese dioxide-zinc rechargeable cell, the capacity decrease becomes severe with repeated charge/discharge cycling due to the following four reasons. First, the manganese content in the manganese dioxide cathode decreases because of the incomplete charging or another side reaction. Second, the structure of electrode/electrolyte interface is deteriorated due to the formation of basic zinc sulfate hydrate, causing the inhibition of the free transfer of charge and mass, which causes electrode reaction difficult to proceed. Third, the internal short circuits occur or long term reversibility decreases due to the dendritic growth of zinc anode and irregular electrodeposition. Fourth, decomposition of electrolyte and gas evolution are accelerated due to the increase of overpotential of zinc anode. Therefore, a new design for the constituents and compositions of electrolyte or cell are required to solve those problems. For example, there can be included the change of crystal structure of manganese dioxide, the improvement of production conditions of electrode and the change of compositions of cathode/anode material.

The present invention provides a method to solve the above-mentioned problems by adding new compounds to an electrolyte and/or cell constituents. In other words, the method according to the present invention solves the decrease of manganese content in the manganese dioxide cathode by the addition of manganese salt (II) to the electrolyte and/or electrode material. Besides, the addition of manganese (II) salt allows the electrolyte stronger acidic solution, which then inhibits or removes the production of basic zinc sulfate hydrate which may destroy the structure of electrode surface. The manganese (II) salt may be added to any one of the cathode material, anode material or electrolyte, or it may be added to two selected from them or all of them. Furthermore, the addition of carbon powder as the additive for zinc anode suppresses the overpotential of zinc anode, causing the decrease of gas evolution, and causes the even dissolution and electrodeposition of zinc, resulting in the improvement of reversibility of zinc anode.

Examples of manganese (II) salts added to an electrolyte and/or an electrode include $MnSO_4$, $Mn(NO_3)_3$, $Mn(CO_2CH_3)_2$, $MnCl_2$, $MnBr_2$ and $Mn(ClO_4)_2$. These manganese (II) salts may be used singly or as a mixture of two or more of them. Manganese sulfate is most preferred. The amount of manganese (II) salt added together with electrode material should be controlled at an appropriate level depending on electrolyte volume, constituents and composition of the electrode and final concentration of manganese (II) salt. When the manganese (II) salt is added to an electrode material, the amount of the manganese (II) salt added is preferably not more than about 20% by weight, based on the total weight of cathode material or anode material. More preferably, it is not more than about 10% by weight. If the amount of manganese (II) salt added exceeds about 20% by weight, there is a risk of losing the binding force of electrodes. It is desirable that manganese (II) salt has higher purity. When manganese (II) salt is directly added to an electrolyte, the concentration of manganese (II) salt is preferably not more than about 2M and at the same time not more than that of zinc sulfate and more preferably not more than about 0.5M. When an electrode is prepared by adding a part or all of manganese (II) salt to an electrode material, thus prepared electrode showed little different results compared to the case wherein the manganese (II) salt is directly added to an electrolyte. This is because the manganese (II) salt is dissolved into an electrolyte from the electrode material. Therefore, in the following, it is considered that the method wherein manganese (II) salt is directly added to an electrolyte is the same as the method wherein manganese (II) salt is mixed with an electrode material and then dissolved into an electrolyte from the electrode material. In such a case, the concentration of manganese (II) salt in an electrolyte is regarded as the value that all of the manganese (II) salt added to the electrode is dissolved from the electrode.

When manganese sulfate is utilized as a maganese salt, the variation of pH and ionic conductivity of the aqueous electrolyte solution in accordance with the variation of the concentration of zinc sulfate and manganese sulfate are collectively summarized in Table 1. As seen from the table 1, the pH of the aqueous electrolyte solution decreases drastically and the ionic conductivity decreases gradually, as manganese sulfate is added to 2M aqueous zinc sulfate solution. However, the ionic conductivity decreases to an extent that it may be sufficiently utilized as an electrolyte of rechargeable cell. On the other hand, the decrease of the pH of the aqueous electrolyte solution may have an advantage that the formation of basic zinc sulfate hydrates that may destruct the surface structure of electrode can be inhibited or removed.

TABLE 1

The changes of pH and ionic conductivity of the aqueous electrolyte solution in accordance with the change of the concentration of zinc sulfate and manganese sulfate

| Concentration (M) | | | Ionic conductivity at room |
|---|---|---|---|
| Zinc sulfate | Manganese sulfate | pH | temperature (mS/cm) |
| 1 | 0 | 5.02 | 43.8 |
| 2 | 0 | 4.32 | 50.5 |
| 2 | 0.1 | 3.06 | 50.0 |
| 2 | 0.2 | 2.74 | 49.4 |
| 2 | 0.5 | 2.31 | 47.0 |
| 2 | 1.0 | 1.94 | 41.5 |
| 2 | 2.0 | 1.48 | 26.4 |

Part of the effect of the present invention may be obtained only by adding manganese (II) salt into the cathode material, anode material and/or electrolyte. However, more preferably, the effect of the present invention may be obtained by adding carbon powder to zinc anode together with the addition of manganese (II) salt.

As carbon powder added to a zinc anode, there can be mentioned at least one of them selected from the group consisting of acetylene black, thermal black, furnace black, channel black, graphite and activated carbon. Among them, it is advantageous that furnace black or carbon black having a large surface area is used. Acetylene black and thermal black are obtained by pyrolysis of acetylene without the supply of oxygen in a closed chamber, and thus have small surface area, large density and little surface functional groups. Furnace black is obtained by decomposing hydrocarbons in the presence of oxygen and has, in general, large surface area, small density and much surface functional groups. Like furnace black, channel black is also obtained via incomplete combustion. The content of carbon powder added to zinc anode is not more than 15%, based on the total amount of anode material. Generally, it is preferred that it is used in amount of not more than 10%. When the content of carbon powder added exceeds 15% or more, the energy density decreases and other adverse effect may be caused due to the several side reactions on the surface of carbon. It is very important that carbon powder should be mixed with the zinc powder and binder to be evenly dispersed throughout the electrode. The method for mixing may be suitably selected depending on the physicochemical properties of constituents, the shape of electrodes and the desired electrode characteristic. Like zinc anode, carbon powder may be added to manganese dioxide cathode, however, in such a case, it is employed as a conducting material to complement the low electronic conductivity encountered with manganese dioxide.

The present invention is described in more detail by referring to examples without limiting it in any way. In particular, the examples demonstrate the fabrication of a cell by using aqueous zinc sulfate solution electrolyte according to the present invention and charging/discharging experimental results.

Fabrication of Manganese Dioxide/Aqueous Zinc Sulfate Solution/Zinc Rechargeable Cell and Charge/Discharge Cycling Experiment Example 1

The electrolytic manganese dioxide as a cathode material, acetylene black as a conducting material (surface area of 64

$m^2/g$) and PTFE (polytetrafluoroethylene) as a binder were mixed in a weight ratio of 20:4:1. Then the mixture was dispersed in isopropanol to form a paste. The paste was applied onto a stainless steel grid, followed by pressing and drying in air at room temperature to form a cathode. Separately, zinc metal powder (325 mesh, 99.5%), acetylene black additive (surface are of 64 $m^2/g$) and PTFE were mixed in a weight ratio of 200:2:1, and then an anode was prepared in a similar fashion to the cathode. Zinc sulfate (99.7%) was dissolved in deionized water in a concentration of 2M, in which manganese sulfate (99.3%) was dissolved in a concentration of 0.5M. The resulting solution was utilized as an electrolyte. After discharging was carried out at a constant current of 0.4 C to a voltage of 1.0 V (vs. $Zn/Zn^{2+}$), charging was carried out at the same rate to a voltage of 1.9 V (vs. $Zn/Zn^{2+}$). This serial operation of discharge-charge was defined as one cycle. The changes of discharge capacity in accordance with the cycle number of charging/discharging are shown as (A) in FIG. 1. It can be understood that the discharge capacity was not substantially lowered.

Example 2

A manganese dioxide cathode was fabricated in the same manner as in Example 1. Zinc metal powder (325 mesh, 99.5%), manganese sulfate (99.3%), acetylene black additive (surfaces are of 64 $m^2/g$) and PTFE were mixed in a weight ratio of 200:20:2:1 and then an anode was fabricated in the same manner as the cathode. Zinc sulfate (99.7%) was dissolved in deionized water in a concentration of 2M, and the resulting solution was utilized as an electrolyte. The final concentration of manganese sulfate was adjusted to approximately 0.1M. The charging/discharging was carried out at a constant current in the same manner as in Example 1. The changes of discharge capacity in accordance with the cycle number of charging/discharging are shown as (B) in FIG. 1. It can be understood that the discharge capacity was not substantially lowered.

Example 3

A manganese dioxide cathode and a zinc anode were fabricated in the same manner as in Example 1. Zinc sulfate (99.7%) was dissolved in deionized water in a concentration of 2M, in which manganese nitrate (99.9%) was dissolved in a concentration of 0.1M. The resulting solution was utilized as an electrolyte. The charging/discharging was carried out at a constant current in the same manner as in Example 1. The changes of discharge capacity in accordance with the cycle number of charging/discharging are shown as (C) in FIG. 2. It can be understood that the discharge capacity was not much lowered.

Example 4

A manganese dioxide cathode and a zinc anode were fabricated in the same manner as in Example 1. Zinc sulfate (99.7%) was dissolved in deionized water in a concentration of 2M, in which manganese acetate (99.5%) was dissolved in a concentration of 0.1M. The resulting solution was utilized as an electrolyte. The charging/discharging was carried out at a constant current in the same manner as in Example 1. The changes of discharge capacity in accordance with the cycle number of charging/discharging are shown as (D) in FIG. 2. It can be understood that the discharge capacity was not much lowered.

Example 5

A manganese dioxide cathode and a zinc anode were fabricated in the same manner as in Example 1. Zinc sulfate (99.7%) was dissolved in deionized water in a concentration of 2M, in which manganese chloride (99%) was dissolved in a concentration of 0.1M. The resulting solution was utilized as an electrolyte. The charging/discharging was carried out at a constant current in the same manner as in Example 1. The changes of discharge capacity in accordance with the cycle number of charging/discharging are shown as (E) in FIG. 2. It can be understood that the discharge capacity was not much lowered.

Example 6

A manganese dioxide cathode and a zinc anode were fabricated in the same manner as in Example 1. Zinc sulfate (99.7%) was dissolved in deionized water in a concentration of 2M, in which manganese bromide (99%) was dissolved in a concentration of 0.1M. The resulting solution was utilized as an electrolyte. The charging/discharging was carried out at a constant current in the same manner as in Example 1. The changes of discharge capacity in accordance with the cycle number of charging/discharging are shown as (F) in FIG. 2. It can be understood that the discharge capacity was not greatly lowered.

Example 7

A manganese dioxide cathode and a zinc anode were fabricated in the same manner as in Example 1. Zinc sulfate (99.7%) was dissolved in deionized water in a concentration of 2M, in which manganese perchlorate (99%) was dissolved in a concentration of 0.1M. The resulting solution was utilized as an electrolyte. The charging/discharging was carried out at a constant current in the same manner as in Example 1. The changes of discharge capacity in accordance with the cycle number of charging/discharging are shown as (G) in FIG. 2. It can be understood that the discharge capacity was not greatly lowered.

Example 8 (Comparative Example to Examples 1 to 7)

A manganese dioxide cathode and a zinc anode were fabricated in the same manner as in Example 1. Zinc sulfate (99.7%) was dissolved in deionized water in a concentration of 2M. The resulting solution was utilized as an electrolyte. This example was carried out in the same manner as in Examples 1 to 7 except that manganese (II) salt was not added to the electrolyte or electrode material. The charging/discharging was carried out at a constant current in the same manner as in Examples 1 to 7. The changes of discharge capacity in accordance with the cycle number of charging/discharging are shown as (H) in FIGS. 1 and 2. It was found that the discharge capacity was drastically lowered during the initial several cycles of charging/discharging when manganese (II) salt was not added.

Example 9

The synthetic manganese dioxide as a cathode material, acetylene black as a conducting material (surface area of 64 $m^2/g$) and PTFE (polytetrafluoroethylene) as a binder were mixed in a weight ratio of 20:4:1. Then the mixture was dispersed in isopropanol to form a paste. The paste was applied onto a stainless steel grid, followed by pressing and drying in air at room temperature to form a cathode. Separately, zinc metal powder (325 mesh, 99.5%), acetylene black additive (surface are of 64 $m^2/g$) and PTFE were mixed in a weight ratio of 200:2:1, and then an anode was fabricated in a similar fashion to the cathode. Zinc sulfate (99.7%) was dissolved in deionized water in a concentration of 2M, in which manganese sulfate (99.3%) was dissolved in a concentration of 0.5M. The resulting solution was utilized as an electrolyte. After discharging was carried out at a constant current of 0.4 C to a voltage of 1.0 V (vs. $Zn/Zn^{2+}$), charging was carried out at the same rate to a voltage of 1.9 V (vs. $Zn/Zn^{2+}$). This serial operation of discharge-charge was defined as one cycle. The changes of discharge capacity in accordance with the cycle number of charging/discharging are shown as (I) in FIG. 3. It can be understood that the decrease of discharge capacity was considerably suppressed.

Example 10

A manganese dioxide cathode and a zinc anode were fabricated in the same manner as in Example 9. Zinc sulfate (99.7%) was dissolved in deionized water in a concentration of 2M, in which manganese sulfate (99.3%) was dissolved in a concentration of 0.1M. The resulting solution was utilized as an electrolyte. The charging/discharging was carried out at a constant current in the same manner as in Example 9. The changes of discharge capacity in accordance with the cycle number of charging/discharging are shown as (J) in FIG. 3. It can be understood that the discharge capacity was not substantially lowered.

Example 11 (Comparative Example to Examples 9 and 10)

A manganese dioxide cathode and a zinc anode were fabricated in the same manner as in Example 9. Zinc sulfate (99.7%) was dissolved in deionized water in a concentration of 2M. The resulting solution was utilized as an electrolyte. This example was carried out in the same manner as in Examples 9 and 10 except that manganese (II) salt was not added to the electrolyte. The charging/discharging was carried out at a constant current in the same manner as in Examples 9 and 10. The changes of discharge capacity in accordance with the cycle number of charging/discharging are shown as (K) in FIG. 3. It was found that the discharging capacity was drastically lowered during the initial several cycles of charging/discharging when manganese (II) salt was not added.

Example 12

Figure 4:
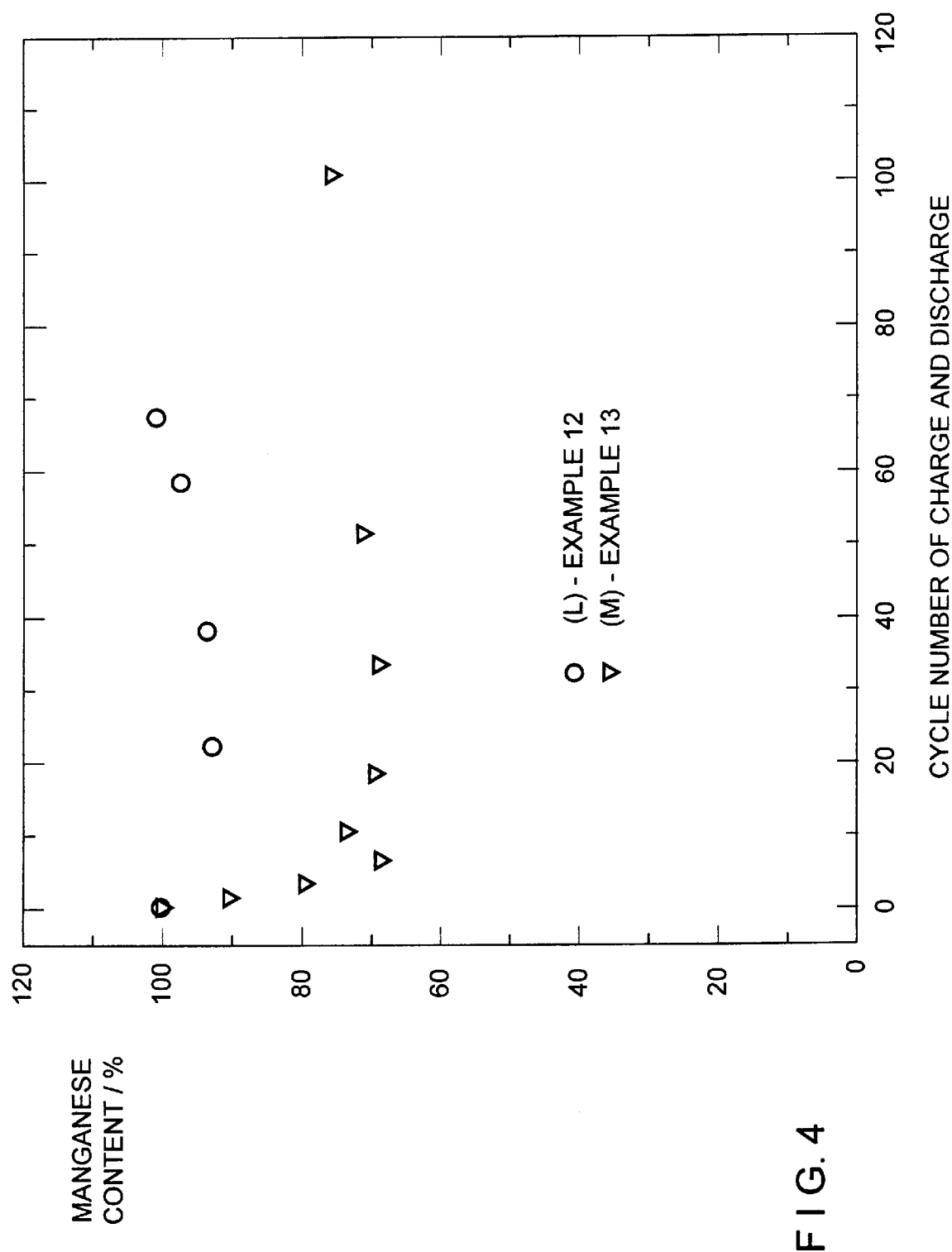
FIG. 4 shows a comparison of the variation of Mn content in manganese dioxide cathode of manganese dioxide-zinc rechargeable cell produced in accordance with Example 12 of the present invention and Comparative Example (Example 13) according to the cycle number of charge and discharge at a constant current.

A cell was fabricated and then charging/discharging was carried out in the same manner as in Example 10. After the repetition of random cycles of charging/discharging, the manganese dioxide cathode was dismounted and subjected to examining the content of manganese element in the electrode. The changes of manganese content in accordance with the cycle number of charging/discharging based on the initial manganese content (100%) are shown as (L) in FIG. 4. It was found that the manganese content was not substantially lowered.

Example 13 (Comparative Example to Example 12)

A cell was fabricated and then charging/discharging was carried out in the same manner as in Example 11. After the repetition of random cycles of charging/discharging, the manganese dioxide cathode was dismounted and subjected to examining the content of manganese element in the electrode. The changes of manganese content in accordance with the cycle number of charging/discharging based on the initial manganese content (100%) are shown as (M) in FIG. 4. It was found that the manganese content was drastically lowered during the initial several cycles of charging/discharging when manganese (II) salt was not added.

Example 14

Figure 5:
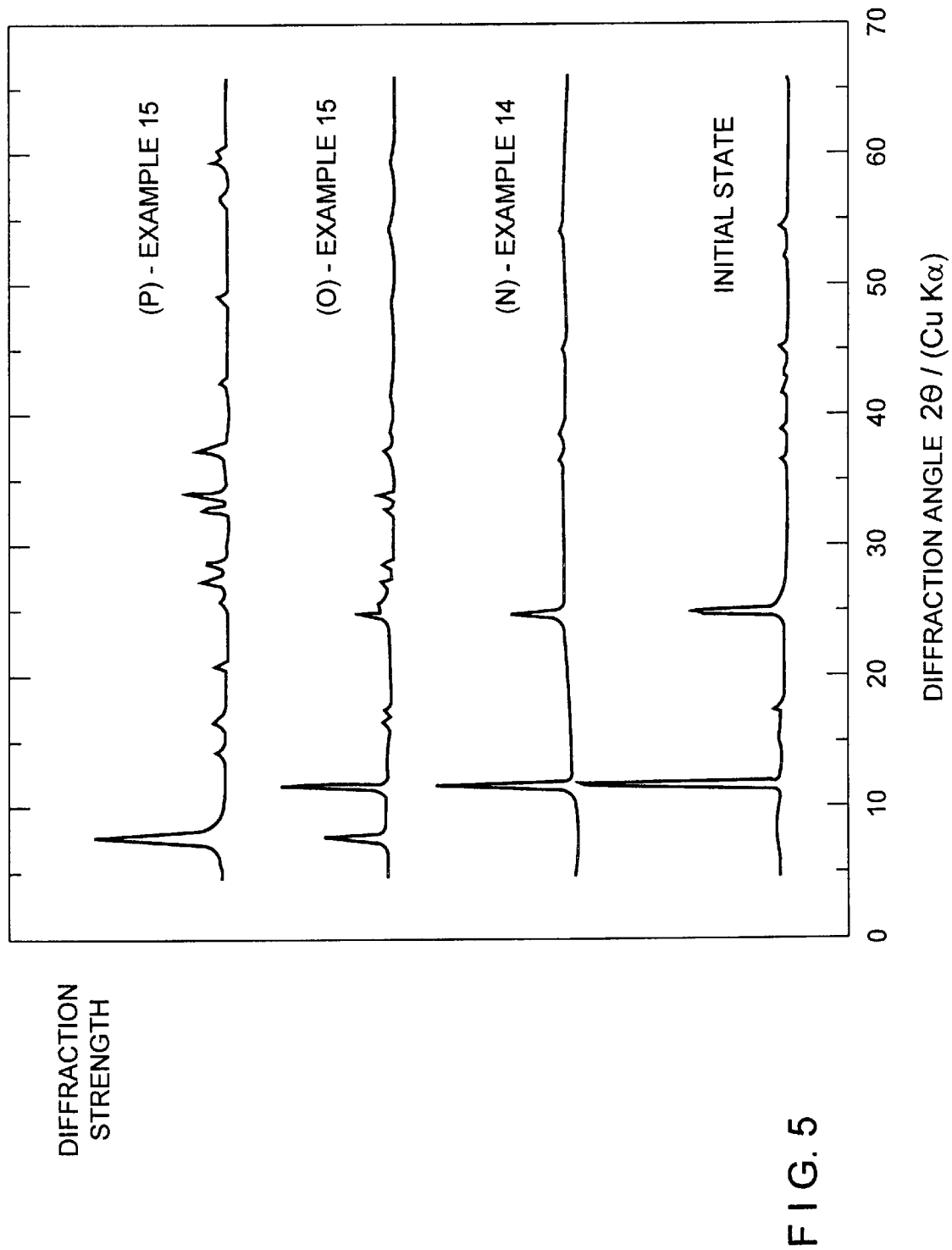
FIG. 5 shows a comparison of the result of X-ray diffraction (XRD) pattern of manganese dioxide cathode of manganese dioxide-zinc rechargeable cell produced in accordance with Example 14 of the present invention and Comparative Example (Example 15) after 10 cycles of charge and discharge at a constant current.

A cell was fabricated and then charging/discharging was carried out in the same manner as in Example 9. After the repetition of 10 cycles of charging/discharging, the cell was dismantled and the manganese dioxide cathode was dismounted. The manganese dioxide cathode was subjected to X-ray diffraction analysis to compare the crystal structure of manganese dioxide cathode with that of at the initial state. The results of the crystal structure of manganese dioxide cathode after 10 cycles of charging/discharging are shown as (N) in FIG. 5. It was found that the manganese dioxide cathode completely maintained its initial crystal structure after 10 cycles of charging/discharging and the basic zinc sulfate hydrate was barely found.

Example 15 (Comparison Example to Example 14)

A cell was fabricated and then charging/discharging was carried out in the same manner as in Example 11. After the repetition of 10 cycles of charging/discharging, the cell was dismantled and the manganese dioxide cathode is dismounted. The manganese dioxide cathode was subjected to X-ray diffraction analysis to compare the crystal structure of manganese dioxide cathode with that of at the initial state. The results of the crystal structure of manganese dioxide cathode after 10 cycles of charging/discharging are shown as (O) in FIG. 5. It was found that large amount of the basic zinc sulfate tetrahydrate, $ZnSO_4 \cdot 3Zn(OH)_2 \cdot 4H_2O$ after 10 cycles of charging/discharging. In order to compare in more detail, the basic zinc sulfate hydrates such as trihydrate, tetrahydrate and pentahydrate were synthesized in accordance with the method of Bear et al., and subjected to X-ray diffraction analysis. The results are shown as (P) in FIG. 5.

Example 16

The electrolytic manganese dioxide as a cathode material, acetylene black as a conducting material (surface area of 64 $m^2/g$) and PTFE (polytetrafluoroethylene) as a binder were mixed in a weight ratio of 20:4:1. Then the mixture was dispersed in isopropanol to form a paste. The paste was spread on a stainless steel grid, followed by pressing and drying in air at room temperature to form a cathode. Separately, zinc metal powder (325 mesh, 99.5%), furnace black additive (surface area of 1350 $m^2/g$) and PTFE were mixed in a weight ratio of 200:2:1, and then an anode was fabricated in the same manner as the cathode. Zinc sulfate (99.7%) was dissolved in deionized water in a concentration of 2M, in which manganese sulfate (99.3%) was dissolved in a concentration of 0.5M. The resulting solution was utilized as an electrolyte. After discharging was carried out at a constant current of 0.4 C to a voltage of 1.0 V (vs. $Zn/Zn^{2+}$), charging was carried out at the same rate to a voltage of 1.9 V (vs. $Zn/Zn^{2+}$). This serial operation of discharge-charge was defined as one cycle. This example was carried out in the same manner as in Example 1 except that furnace black was used the zinc anode additive. The changes of discharge capacity in accordance with the cycle number of charging/discharging are shown as (Q) in FIG. 6. It was found that the decrease of discharge capacity is inhibited.

Example 17

A manganese dioxide cathode was fabricated in the same manner as in Example 16. Separately, zinc metal powder (325 mesh, 99.5%), manganese sulfate (99.3%), furnace black additive (surfaces are of 1350 m$^2$/g) and PTFE were mixed in a weight ratio of 200:20:2:1 and then an anode was fabricated in the same manner as in a cathode. Zinc sulfate (99.7%) was dissolved in deionized water in a concentration of 2M, and the resulting solution was utilized as an electrolyte. The final concentration of manganese sulfate was adjusted to about 0.1M. The charging/discharging was carried out at a constant current in the same manner as in Example 16. This example was carried out in the same manner as in Example 2 except that furnace black was used as the zinc anode additive. The changes of discharge capacity in accordance with the cycle number of charging/discharging are shown as (R) in FIG. 6. It was found that the decrease of discharge capacity is inhibited.

Example 18

A manganese dioxide cathode and a zinc anode were fabricated in the same manner as in Example 16. Zinc sulfate (99.7%) was dissolved in deionized water in a concentration of 2M, in which manganese nitrate (99.9%) was dissolved in a concentration of 0.1M. The resulting solution was utilized as an electrolyte. The charging/discharging was carried out at a constant current in the same manner as in Example 16. This example was carried out in the same manner as in Example 3 except that furnace black was used as the zinc anode additive. The changes of discharge capacity in accordance with the cycle number of charging/discharging are shown as (S) in FIG. 7. It was found that the decrease of discharge capacity is inhibited.

Example 19

A manganese dioxide cathode and a zinc anode were fabricated in the same manner as in Example 16. Zinc sulfate (99.7%) was dissolved in deionized water in a concentration of 2M, in which manganese acetate (99.5%) was dissolved in a concentration of 0.1M. The resulting solution was utilized as an electrolyte. The charging/discharging was carried out at a constant current in the same manner as in Example 16. This example was carried out in the same manner as in Example 4 except that furnace black was used as the zinc anode additive. The changes of discharge capacity in accordance with the cycle number of charging/discharging are shown as (T) in FIG. 7. It was found that the decrease of discharge capacity is inhibited.

Example 20

A manganese dioxide cathode and a zinc anode were fabricated in the same manner as in Example 16. Zinc sulfate (99.7%) was dissolved in deionized water in a concentration of 2M, in which manganese chloride (99%) was dissolved in a concentration of 0.1M. The resulting solution was utilized as an electrolyte. The charging/discharging was carried out at a constant current in the same manner as in Example 16. This example was carried out in the same manner as in Example 5 except that furnace black was used as the zinc anode additive. The changes of discharge capacity in accordance with the cycle number of charging/discharging are shown as (U) in FIG. 7. It was found that the decrease of discharge capacity is inhibited.

Example 21

A manganese dioxide cathode and a zinc anode were fabricated in the same manner as in Example 16. Zinc sulfate (99.7%) was dissolved in deionized water in a concentration of 2M, in which manganese bromide (99%) was dissolved in a concentration of 0.1M. The resulting solution was utilized as an electrolyte. The charging/discharging was carried out at a constant current in the same manner as in Example 16. This example was carried out in the same manner as in Example 6 except that furnace black was used as the zinc anode additive. The changes of discharge capacity in accordance with the cycle number of charging/discharging are shown as (V) in FIG. 7. It was found that the decrease of discharge capacity is inhibited.

Example 22

A manganese dioxide cathode and a zinc anode were fabricated in the same manner as in Example 16. Zinc sulfate (99.7%) was dissolved in deionized water in a concentration of 2M, in which manganese perchlorate (99%) was dissolved in a concentration of 0.1M. The resulting solution was utilized as an electrolyte. The charging/discharging was carried out at a constant current in the same manner as in Example 16. This example was carried out in the same manner as in Example 7 except that furnace black was used as the zinc anode additive. The changes of discharge capacity in accordance with the cycle number of charging/discharging are shown as (W) in FIG. 7. It was found that the decrease of discharge capacity is inhibited.

Example 23

The synthetic manganese dioxide as a cathode material, acetylene black as a conducting material (surface area of 64 m$^2$/g) and PTFE (polytetrafluoroethylene) as a binder were mixed in a weight ratio of 20:4:1. Then the mixture was dispersed in isopropanol to form a paste. The paste was spread on a stainless steel grid, followed by pressing and drying in air at room temperature to form a cathode. Separately, zinc metal powder (325 mesh, 99.5%), furnace black additive (surface area of 1350 m$^2$/g) and PTFE were mixed in a weight ratio of 200:2:1, and then an anode was fabricated in the same manner as the cathode. Zinc sulfate (99.7%) was dissolved in deionized water in a concentration of 2M, in which manganese sulfate (99.3%) was dissolved in a concentration of 0.5M. The resulting solution was utilized as an electrolyte. After discharging was carried out at a constant current of 0.4 C to a voltage of 1.0 V (vs. Zn/Zn$^{2+}$), charging was carried out at the same rate to a voltage of 1.9 V (vs. Zn/Zn$^{2+}$). This serial operation of discharge-charge was defined as one cycle. This example was carried out in the same manner as in Example 9 except that furnace black was used as the Zinc anode additive. The changes of discharge capacity in accordance with the cycle number of charging/discharging are shown as (X) in FIG. 8. It was found that the decrease of discharge capacity is inhibited.

Example 24

A manganese dioxide cathode and a zinc anode were fabricated in the same manner as in Example 23. Zinc sulfate (99.7%) was dissolved in deionized water in a concentration of 2M, in which manganese sulfate (99.3%) was dissolved in a concentration of 0.1M. The resulting solution was utilized as an electrolyte. The charging/discharging was carried out at a constant current in the same manner as in Example 23. This example was carried out in the same manner as in Example 10 except that furnace black was used as the zinc anode additive. The changes of discharge capacity in accordance with the cycle number of charging/discharging are shown as (Y) in FIG. 8 and FIG. 9. It was found that the decrease of discharge capacity is inhibited.

Example 25

The synthetic manganese dioxide as a cathode material, furnace black as a conducting material (surface area of 1350 m$^2$/g) and PTFE (polytetrafluoroethylene) as a binder were mixed in a weight ratio of 20:4:1. Then the mixture was dispersed in isopropanol to form a paste. The paste was spread on a stainless steel grid, followed by pressing and drying in air at room temperature to form a cathode. A Zn anode and electrolyte were prepared in the same manner as in Example 24. Then charge/discharge cycling were carried out at a constant current in the same manner as in Example 24. This Example was carried out in the same manner as in Example 24 except that furnace black was used as the zinc anode additive. The changes of discharge capacity in accordance with the cycle number of charging/discharging are shown as (Z) in FIG. 9. It was found that the discharge capacity is slightly lowered.

Effect of the Invention

Figure 3:
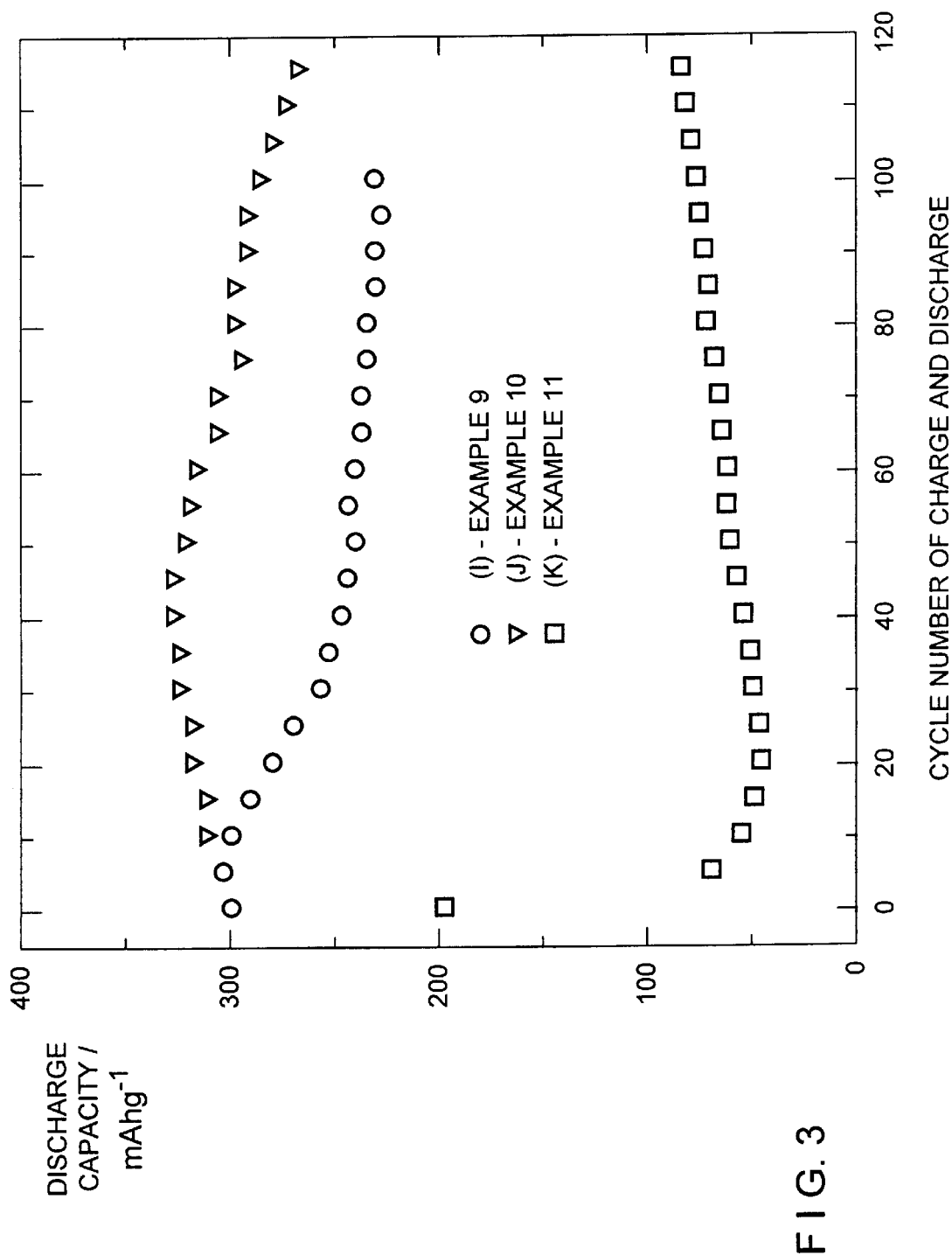
FIG. 3 shows a comparison of the variation of discharge capacities of manganese dioxide-zinc rechargeable cell produced in accordance with Examples 9 and 10 of the present invention and Comparative Example (Example 11) according to the cycle number of charge and discharge at a constant current.

As seen from the charging/discharging experimental results of the cells prepared by the present invention, the addition of manganese (II) salt can suppress the capacity decrease with repeated charge/discharging cycling, which is confirmed in FIGS. 1, 2 and 3. This is because the addition of manganese (II) salt can solve the two problems that lead to capacity loss, as seen from FIG. 4 and FIG. 5:

i) Mn content in the manganese dioxide cathode decreases due to the incomplete charging or other side reactions, and ii) Surface structure of the electrode is deteriorated due to the formation of the basic zinc sulfate hydrate to hinder the free transfer of charge and mass, causing the electrode reaction difficult to proceed.

Figure 6:
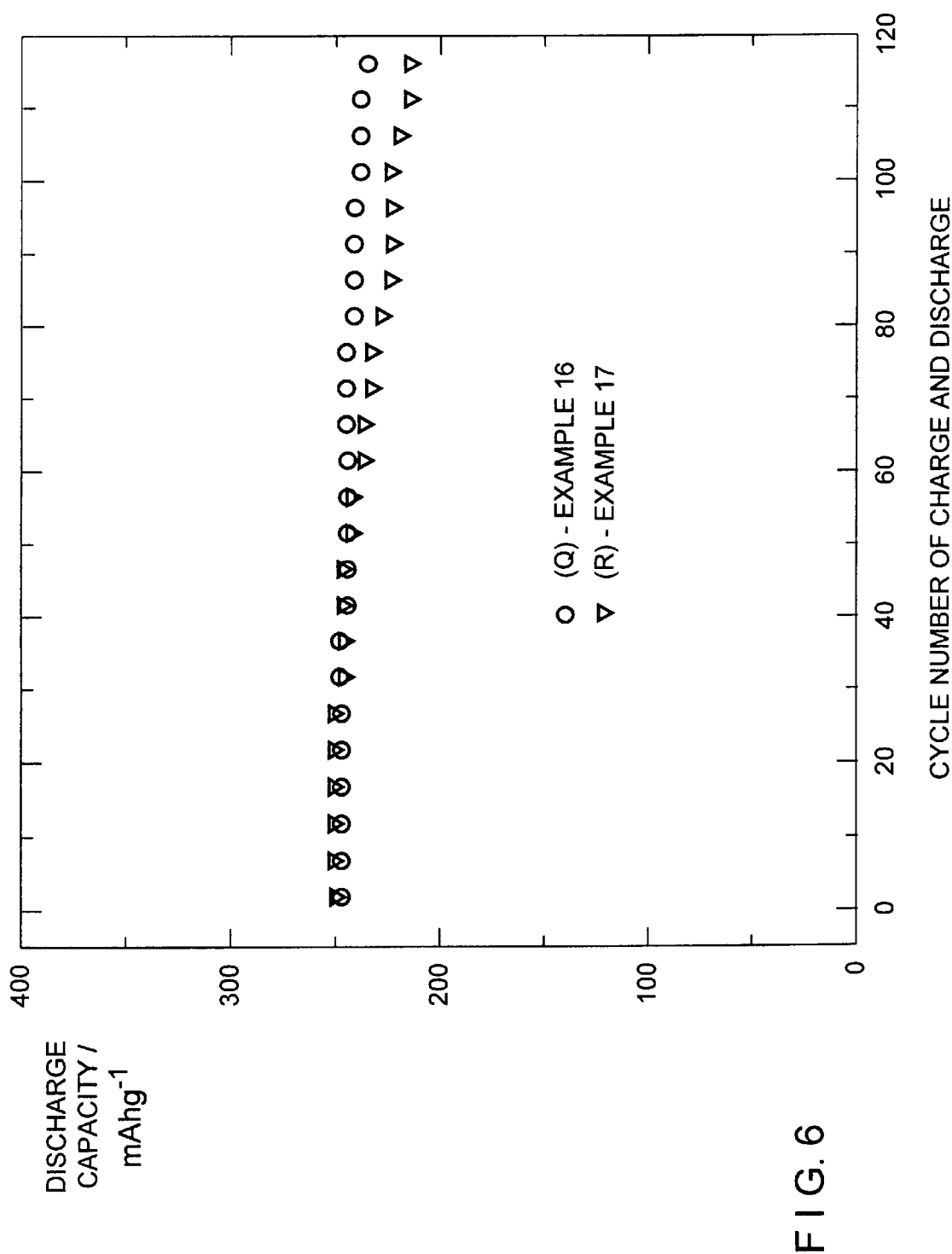
FIG. 6 shows a comparison of the variation of discharge capacities of manganese dioxide-zinc rechargeable cell produced in accordance with Examples 16 and 17 of the present invention according to the cycle number of charge and discharge at a constant current.
Figure 7:
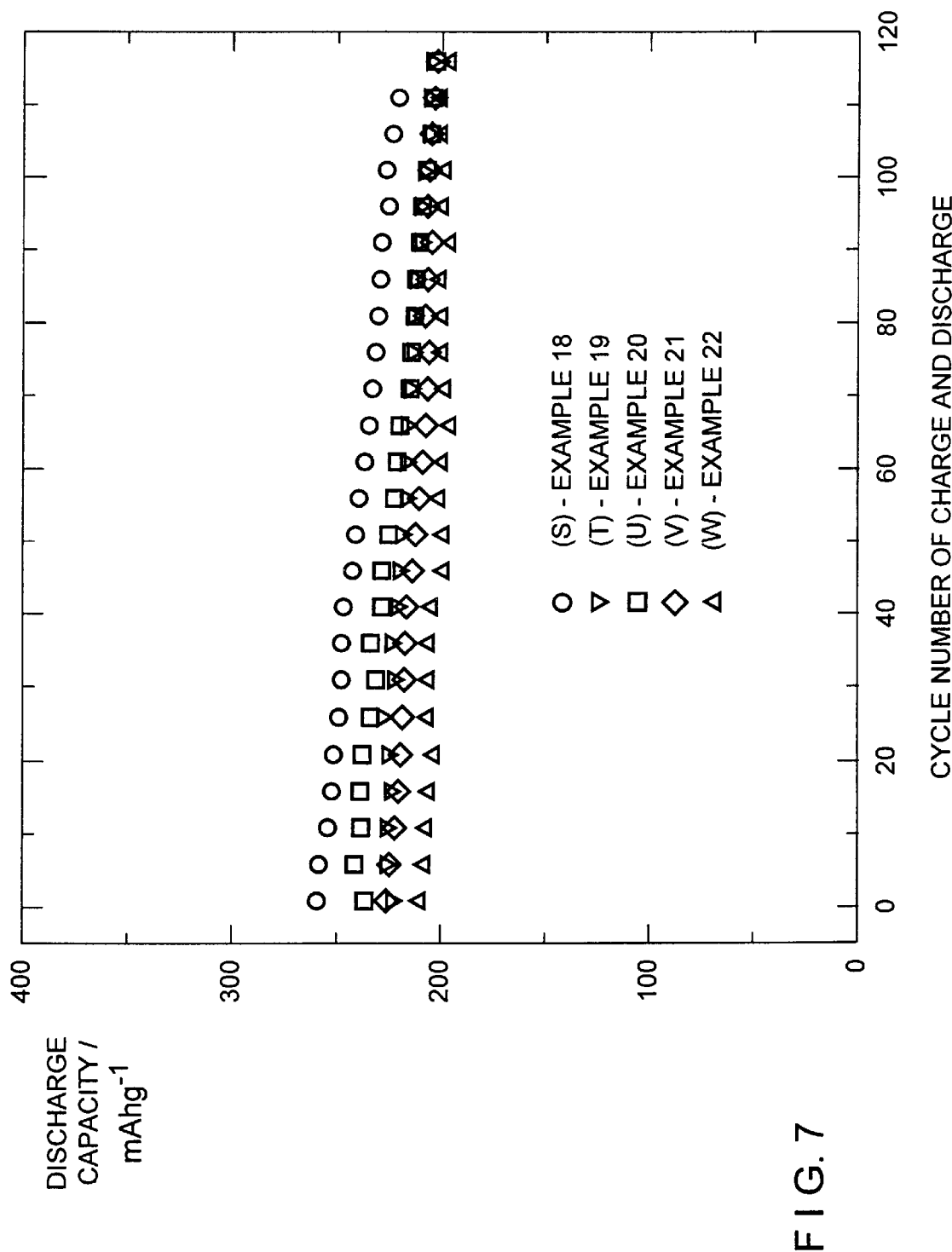
FIG. 7 shows a comparison of the variation of discharge capacities of manganese dioxide-zinc rechargeable cell produced in accordance with Examples 18, 19, 20, 21 and 22 of the present invention according to the cycle number of charge and discharge at a constant current.
Figure 8:
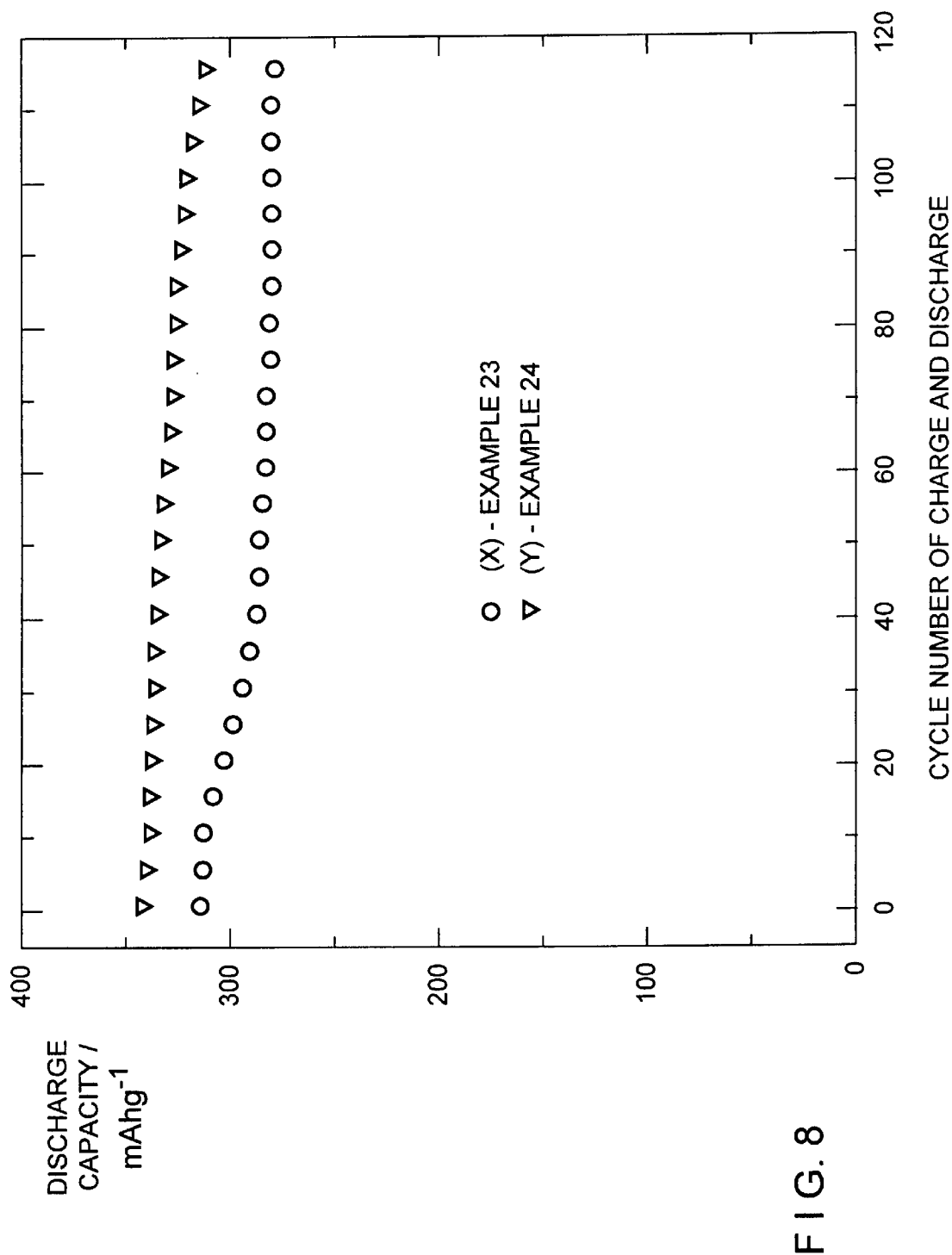
FIG. 8 shows a comparison of the variation of discharge capacities of manganese dioxide-zinc rechargeable cell produced in accordance with Examples 23 and 24 of the present invention according to the cycle number of charge and discharge at a constant current.

Furthermore, as seen from FIGS. 6, 7 and 8, the addition of carbon powder into the zinc anode can suppress the increase of overpotential of the zinc anode. This thereby decreases gas evolution, and causes the electrodeposition and dissolution of zinc evenly, resulting in the improvement in the reversibility of the zinc anode. As such, the addition of carbon powder additive into the zinc anode can solve two causes of capacity decrease:

i) Dendritic growth and irregular electrodeposition of the zinc anode may cause the internal short circuit or the decline of long term reversibility, and ii) Increase of overpotential of the zinc anode may accelerate the decomposition of electrolyte and gas evolution.

Figure 9:
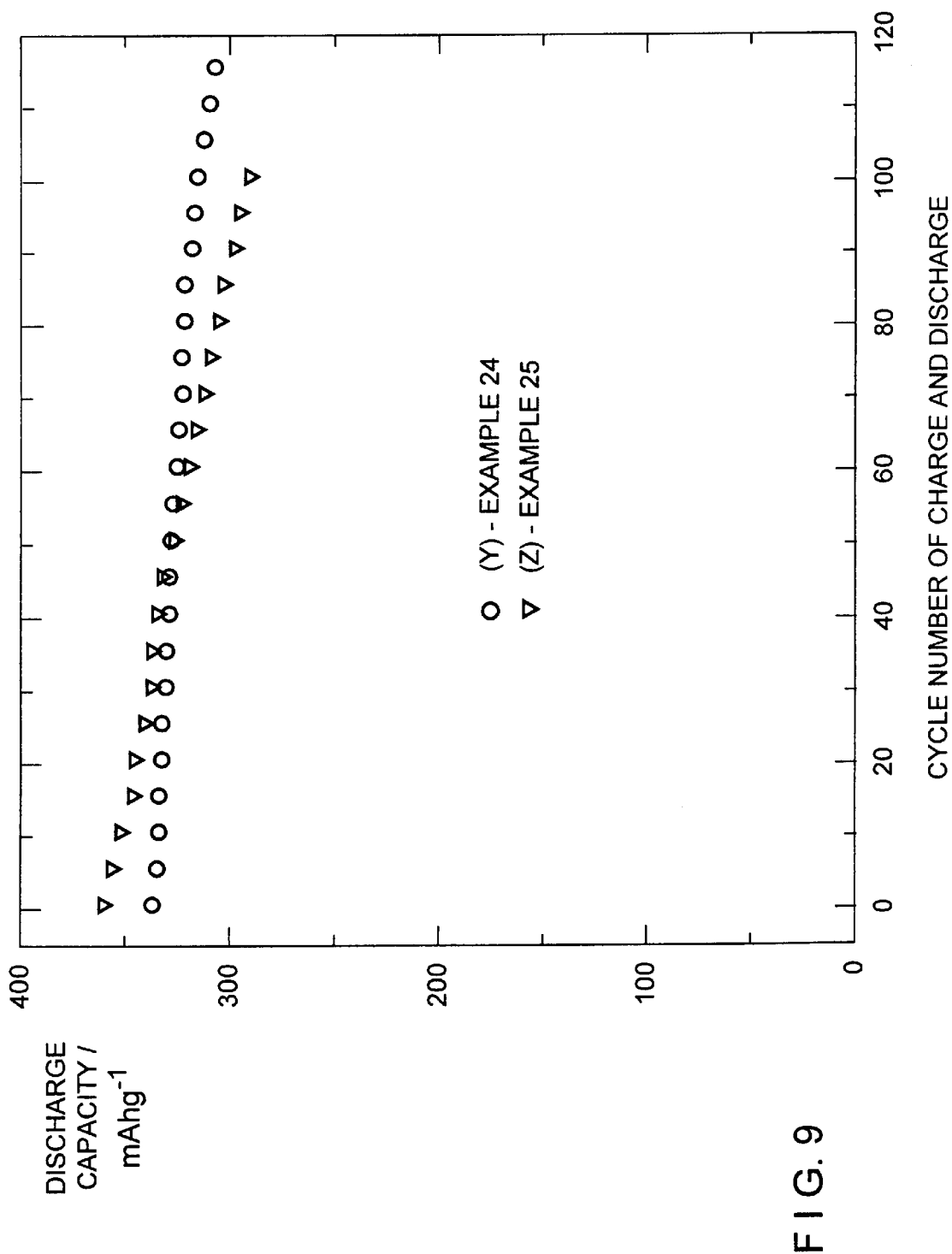
FIG. 9 shows a comparison of the variation of discharge capacities of manganese dioxide-zinc rechargeable cell produced in accordance with Examples 24 and 25 of the present invention according to the cycle number of charge and discharge at a constant current.

In addition, as seen from FIG. 9, it was found that the addition of appropriate carbon black as a conducting material into the manganese dioxide cathode could significantly prevent the decrease in cell capacity.

In sum, it can be understood from the above results that the manganese dioxide/aqueous zinc sulfate solution/zinc cell, wherein manganese (II) salt is added to the electrode material and/or electrolyte and carbon powder is added to the zinc anode, has excellent capacity and reversibility as a rechargeable cell.

What is claimed is:

1. A rechargeable cell comprising a cathode comprising a cathode material, an anode comprising an anode material and an electrolyte, wherein said cathode material comprises a mixture of manganese dioxide and electrically conducting material, said anode material comprises zinc or a zinc alloy, said electrolyte comprises 0.5M to 3M aqueous zinc sulfate solution, and wherein manganese (II) salt is added to at least one of said cathode material, anode material or electrolyte.

2. A rechargeable cell according to claim 1, wherein said manganese (II) salt is at least one selected from the group consisting of manganese sulfate ($MnSO_4$), manganese nitrate ($Mn(NO_3)_3$), manganese acetate ($Mn(CO_2CH_3)_2$), manganese chloride ($MnCl_2$), manganese bromide ($MnBr_2$) and manganese perchlorate ($Mn(ClO_4)_2$).

3. A rechargeable cell according to claim 1, wherein said manganese (II) salt is incorporated into the cathode material and/or anode material and also into the electrolyte.

4. A rechargeable cell according to claim 1, wherein at least one carbon powder selected from the group consisting of acetylene black, furnace black, channel black, graphite and activated carbon is added to the anode material in an amount of not more than about 15% by weight on the basis of the total amount of the anode material.

5. A rechargeable cell according to claim 1, wherein the electrically conducting material of the cathode material is at least one carbon powder selected from the group consisting of acetylene black, furnace black, channel black, graphite and activated carbon, and it is present in the cathode material in an amount of from 3% by weight to 15% by weight based on the total amount of the cathode material.

6. A rechargeable cell according to claim 1, wherein at least one binder selected from the group consisting of polyacrylonitrile, polyvinyl alcohol, polyvinyl chloride, polyethylene oxide, polytetrafluoroethylene, polyvinylidene difluoride and polymethyl methacrylate is added to the cathode material, anode material or both cathode material and anode material in an amount of not more than about 15% by weight based on the total amount of the cathode material or anode material.

7. A rechargeable cell according to claim 2, wherein said manganese (II) salt is manganese sulfate.

8. A rechargeable cell according to claim 5, wherein said carbon powder of the cathode material is acetylene black or furnace black.

9. A rechargeable cell according to claim 3, wherein the total amount of manganese (II) salt added to the cathode material or anode material is not more than about 20% by weight based on the total sum of cathode weight or anode weight, and the concentration of the manganese (II) salt added to the electrolyte is not more than about 2M and is not more than the concentration of zinc sulfate.

10. A rechargeable cell according to claim 1, wherein said cathode material is mixed with carbon powder as the electrically conducting material and a binder, said anode material is mixed with carbon powder and a binder, and said electrolyte is mixed with manganese sulfate.

11. A rechargeable cell according to claim 4, wherein said carbon powder of the anode material is furnace black.

* * * * *